June 10, 1952 J. F. KOVALSKY 2,600,303
CURRENT-LIMITING SPEED CONTROL APPARATUS
Filed Aug. 19, 1950
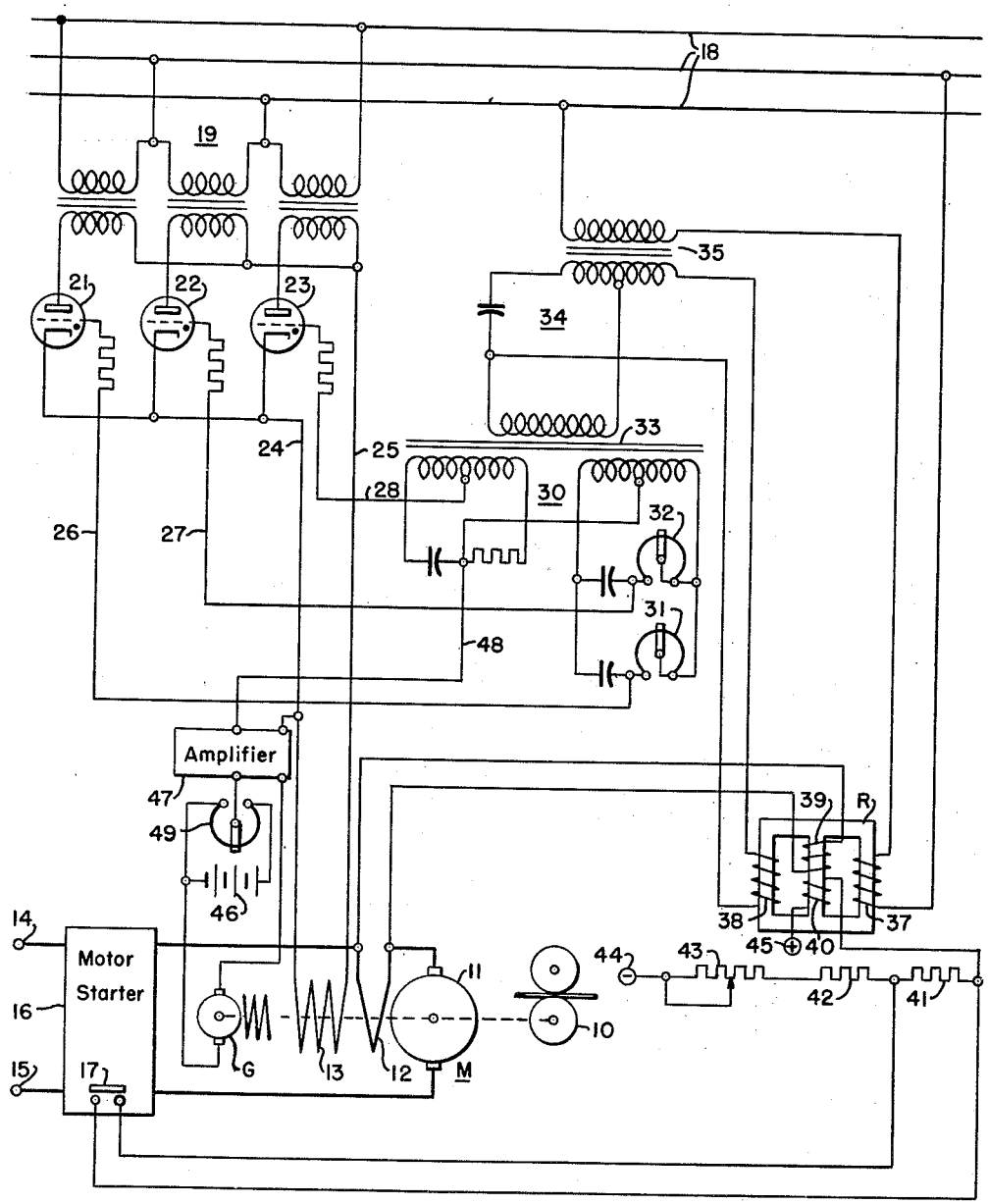
WITNESSES:
INVENTOR
Joseph F. Kovalsky.
BY
ATTORNEY Patented June 10, 1952

2,600,303

UNITED STATES PATENT OFFICE 2,600,303

CURRENT-LIMITING SPEED CONTROL APPARATUS

Joseph F. Kovalsky, Buffalo, N. Y., assignor to Westinghouse Electric Corporation, East Pittsburgh, Pa., a corporation of Pennsylvania Application August 19, 1950, Serial No. 180,375

6 Claims. (Cl. 318—271)

My invention relates to electric apparatus for controlling the speed of an electric motor while limiting the load current of the motor, and more particularly to apparatus of the kind wherein the motor field excitation is supplied from an alternating-current line through speed-responsively controlled rectifiers.

Such apparatus as have heretofore been used in practice, have the control or grid circuit of electronic rectifiers provided with a speed-responsive error voltage to normally control and regulate the drive speed in accordance with a desired speed value, and also require a connection of the same rectifier control or grid circuit with the armature circuit of the motor to provide for automatic limitation of the motor load current during accelerating periods. There are applications of such control apparatus, for instance in sectional paper machine drives, that require an exacting degree of control stability. This requirement is difficult to meet unless the error-responsive circuits are isolated from the motor armature circuit that supplies the load-responsive signal for the current limiting control of the rectifier. The known apparatus capable of securing the desired isolation and stability are intricate and require a large number of electronic circuit components.

It is, therefore, an object of my invention to devise apparatus of the mentioned kind that afford an accurate and sensitive speed control as well as a current limiting operation of high accuracy with the aid of considerably simpler means and a lesser number of electronic tubes than heretofore necessary for comparable performance.

Another more specific object of my invention is to provide a simply designed system in which the motor field circuit to be variably excited for speed regulation is completely isolated from the motor series field winding or other resistance member of the armature circuit whose voltage drop determines the rate of acceleration by limiting the speed in accordance with a preset value of maximum current.

Another object of my invention is to design a current-limiting speed-control system which readily permits a selective adjustment of the current limit to a high value for acceleration control and a much lower value for controlling, during steady-state operation, the tension of the material being fabricated, such as the paper sheet in a paper machine.

In apparatus according to the invention, a direct-current motor has its armature circuit energized from a suitable source of direct current such as a generator or set of rectifiers. The motor has a separately excited field winding for control and regulation of the motor speed, and this field winding is excited from an alternating-current line through a controllable single- or multi-phase rectifier whose control circuit is impressed by component control voltages which include a periodic voltage synchronous with the rectifier plate voltage but phase displaced relative thereto. As regards the features mentioned so far, such an apparatus is similar to those customary and may preferably also contain a composite source of error voltage which impresses on the rectifier control circuit a component direct voltage variable in accordance with the departure of the motor speed from a desired value and effective to regulate the speed to stay at that value.

In contrast to the known apparatus, however, those according to the invention comprise a saturable reactance device whose alternating current windings form part of a phase-shift network for supplying to the rectifier control circuit the above-mentioned periodic component control voltage; and the saturation control windings of the saturable reactance device are connected across a series resistance of the motor armature circuit with the poling needed to increase the rectified field excitation voltage of the motor with an excessive increase in motor armature current. By virtue of other features of my invention, the saturable reactance device operates not only by shifting the phase of the periodic component grid voltage but also by increasing the voltage amplitude thus producing the desired current limitation by the joint and coactive occurrence of both control effects. How this is achieved will be understood from the following description of the illustrated example which embodies the above-mentioned as well as more specific features of the invention.

The drawing represents schematically at 10 a single section of a paper mill, such as a calender, which is to cooperate with other machinery sections of the mill. The section 10 is driven from the armature 11 of a direct-current motor M which has a series field winding 12 and a separately excited main field winding 13. Mounted on the motor shaft is a tachometer generator G to provide a signal voltage indicative of the motor speed. The armature circuit of the motor is energized from terminals 14 and 15, through a motor starting device 16 of any suitable design, from a direct-current generator or other source of adjustable voltage. The motor starting device 16 may include a contact 17, which is open during starting and accelerating periods of the motor M, but is closed manually or automatically when the motor M has reached the normal operating speed.

The main field winding 13 of motor M receives controlled excitation from an alternating-current line 18 through power transformers 19 and three controllable rectifier tubes 21, 22, 23 of the gaseous or vapor type. The rectifier tubes have a common cathode lead 24 connected with one terminal of the motor field winding 13 while a lead 25 connects the other terminal of field winding 13 with the secondary transformer windings. The magnitude of the rectified current applied through tubes 21, 22, 23 to the motor field winding 13 depends upon the voltage conditions in the rectifier control or grid circuits. These grid circuits have respective leads 26, 27 and 28 connected to a phase shift network 30 which provides the grid circuits with an alternating component grid voltage. The network 30 is equipped with calibrating resistors 31 and 32 that permit adjusting the phase difference of the alternating grid voltage components for respective tubes 21 and 22 relative to the alternating component grid voltage for tube 23. During the operation of the system, the adjustment of resistors 31 and 32 is fixed, and the alternating component grid voltage for the three tubes have a mutual phase difference of 120°. The phase shift network 30 is energized through a transformer 33 which is coupled by another phase shift network 34 with a transformer 35 whose primary is connected to the alternating current line 18. Phase shift network 34 and transformer 35 permit imposing on all three tubes alternating component grid voltages for tubes 21, 22 and 23 an additional and variable phase shift as well as an amplitude variation. This variable phase shift and amplitude variation are controlled by two reactance windings 37 and 38 of a saturable reactor or magnetic amplifier R. Winding 37 is series connected with the primary of transformer 35. Winding 38 forms part of the phase shift network 34. The reactor R is shown to be of the three-legged type, although it is known that reactors or reactor devices of various other known designs may be used instead. The degree of saturation of the core of reactor R and hence the effective reactance of windings 37 and 38 is controlled by direct-current coils 39 and 40, which in the illustrated reactor design, are disposed on the center leg. Winding 39 is connected across the series field winding 12 of motor M to receive direct-current excitation proportional to the motor load current. It may be mentioned that, if desired, a separate resistance member may be series connected in the armature circuit of motor M with reactor control coil 39 connected across that resistor. For some applications, it may also be desirable to insert an amplifying device between the series field or other series resistance member of the motor armature circuit and the reactor control coil 39. Coil 40 receives direct-current excitation through resistors 41, 42 and an adjustable rheostat 43 from terminals 44 and 45 which are to be connected to a suitable source of constant direct-current voltage. The coils 39 and 40, or their respective circuits are poled so that the two reactor control windings oppose each other. Thus, the effective reactance of windings 37 and 38 is dependent upon the differential value of the two control coil voltages.

The above-mentioned tachometer generator G is series connected with a source of adjustable reference voltage which is taken from across a selectively adjustable portion of a potentiometer rheostat 49 whose resistor is connected across a suitable source of constant direct-current voltage schematically represented at 46. If desired, this voltage source may be identical with that used for energizing the terminals 44, 45 and may consist of a constant-voltage exciter generator or of a rectifier circuit which takes its power from the alternating-current line 18. The difference between the tachometer voltage and the speed control voltage adjusted at rheostat 49 is applied to the input terminals of an amplifier 47. One output terminal of amplifier 47 is connected with the common cathode lead 24 of the rectifier tubes 21, 22, 23. The other output terminal of amplifier 47 is connected by a lead 48 to the phase shift network 30. The amplifier 47 is preferably of any of the well known amplitude-limiting types so that its output voltage stays within a limited range of, say, ±30 volts, amply sufficient to swing the rectifier tubes from all-out to all-in but small enough to prevent the amplifier from effecting undesired phase shifts.

The control or grid circuits for the rectifier tubes 21, 22, 23 can be traced from the respective control grids through respective leads 26, 27, 28 to the phase shift network 30, thence through lead 48 to the amplifier 47 and from the amplifier to the cathode lead 24. It will be recognized that each of the three grid circuits includes two sources of grid voltages. One source is represented by the phase shift network 30 which, as mentioned, provides the grid circuit with an alternating component voltage. This voltage has normally a fixed phase displacement, preferably of 90°, relative to the anode voltage of the appertaining tube. However, as explained, an additional phase shift and an amplitude variation may be imposed upon the alternating grid voltage component by the functioning of the saturable reactor R. The second source of component grid voltage in each of the rectifier grid circuits is represented by the amplifier 47 and provides a direct-current voltage whose magnitude and polarity depend upon the difference between the speed measuring tachometer voltage and the selectively adjusted reference voltage from across the active portion of rheostat 49.

For explaining the performance of the control system, it appears convenient to first consider the conditions that exist when the motor M and the driven machinery section are in normal operation. Let it further first be assumed that under these conditions, the reactor windings 37 and 38 do not change their reactance so that the alternating-current components impressed on the rectifier grid circuits by the phase shift network 30 have a constant amplitude and a fixed phase position relative to the respective rectifier anode voltages. Then, the firing conditions of the rectifier tubes 21, 22, 23 depend entirely upon the direct component grid voltage supplied from the amplifier 47. As long as the machinery section is running at the correct speed according to the setting of control rheostat 49, the grid voltage conditions and the firing points of the rectifiers remain unchanged. When the section speed departs from the desired value, the corresponding positive or negative change in the differential input voltage of the amplifier 47 causes a corresponding change of the grid voltage component impressed by the amplifier 47 on the rectifier grid circuits. As a result, the system operates in the conventional manner to regulate the section drive motor M for a selected constant driving speed.

Let us now look at the conditions that exist when the motor M accelerates, for instance when the voltage applied to the terminals 14 and 15 is increased from zero to the normal operating value in order to start and accelerate the motor M to full speed before the machinery section is joined with other machinery sections that may already be operating at the normal speed. During such starting periods the motor speed is at first far below the normal speed value for which the above-described speed regulating devices are set. Therefore, the amplifier 47 at first supplies to the rectifier grid circuits a negative voltage component which tends to reduce the firing angle of the rectifiers 21, 22, 23, or may even make them virtually non-conductive. This tendency would weaken the motor field winding 13 so that the motor would speed up with an accompanying steep and high rise in motor current. As a result the electrical and mechanical devices may be subjected to overloads and the electric overload protective devices may operate to stop the motor, thus making a satisfactory starting infeasible or difficult.

In the system according to the invention, the just-mentioned tendency of the speed regulating devices to interfere with proper starting and accelerating of the motor are made impossible by the current responsive operation of the saturable reactor R and the associated phase shift devices 34 and 35. This operation is as follows:

During starting or accelerating periods, the increasing current in the motor armature circuit imposes a corresponding increase in voltage on the control coil 39 of the reactor R. The magnetizing effect of this coil then reduces the constant magnetizing bias from coil 40 so that the reactor core becomes correspondingly less saturated and the effective reactance of windings 37 and 38 correspondingly increased. As a result, the devices 34 and 35 impose on the alternating-current voltage component for rectifier tubes 21, 22, 23 a phase shift up to about 90° toward an increased firing angle of the rectifier tubes and at the same time increase the amplitude of the alternating grid voltage component also with the result of increasing the tube firing angle. Thus the increased load currents flowing through the motor armature circuit during starting and accelerating periods have the effect of overpowering the undesired field weakening effect of the speed regulating devices and imparting to the motor field winding 13 a high or full magnitude of excitation. In this manner the load currents in the motor armature circuit are limited, and the starting of the motor is controlled to occur with a desired degree of smoothness.

Reverting to the normal operation of the system under conditions when the motor speed is at or near the desired value, it will be recognized that the saturable reactor R and the associated phase shift and the amplitude control circuit remain effective to provide for a current limitation of a degree depending upon the bias voltage applied to winding 40. By changing this voltage from a high value for acceleration to a low value for normal operation, the current control can be given such a functioning that it is effective during normal operation to control or limit the tension imposed on the paper or material fabricated by the driven machinery section. The rheostat 43 in the circuit or coil 40 is provided to permit such a selective setting so that the tension to be maintained can be chosen by adjusting the rheostat accordingly. The shifting from high to low excitation of coil 40 may also occur automatically, for instance, by means of the switch contact 17 which is shown to be connected across the resistor 41 in the circuit of coil 40.

Aside from providing a relatively simple system for achieving current limitation during acceleration as well as speed regulation and tension control, a system according to the invention secures a complete isolation between the motor control field winding 13 which effects speed control and regulation, and the motor series field 12 or the motor armature circuit whose current determines the rate of acceleration as well as the desired limit of tension. By thus avoiding leakage and stray phenomena between these two circuits, the system also affords a high degree of stability. The system is further distinguished by having no movable parts that change their position during the regulating performance, and all elements are sufficiently simple and static to avoid the danger of undesirable changes in calibration.

I claim as my invention:

1. Speed-regulating drive control apparatus, comprising, an electric motor including a direct-current armature circuit and a speed-controlling field circuit, alternating current supply means, a controllable rectifier connected between said supply means and said field circuit for applying rectified excitation to said field circuit and having a control circuit whose amplitude and phase position may be changed with reference to the alternating current voltage supplied to the rectifier for varying said excitation, circuit means connecting said control circuit with said supply means to provide said control circuit with periodic control voltage and comprising amplitude control means and phase shift control means, a resistance member series-connected in said armature circuit to provide a variable voltage dependent upon the current in said armature circuit, an inductive coupling device connected with said amplitude control means and with said phase shift control means and having a control circuit for possibly controlling said two control means, said latter control circuit being connected across said resistance member and poled for causing said excitation to increase with increasing values of said current.

2. Speed-regulating drive control apparatus, comprising, an electric motor including a direct-current armature circuit and a speed-controlling field circuit, alternating current supply means, a controllable rectifier connected between said supply means and said field circuit for applying rectified excitation to said field circuit and having a control circuit for varying said excitation, a transformer having a primary circuit connected to said supply means and having a secondary phase shift circuit connected with said control circuit to provide the latter with alternating control voltage, a saturable reactance device having two alternating-current windings connected in said primary circuit and in said phase shift circuit respectively to control amplitude and phase respectively of said alternating control voltage in dependence upon the degree of saturation of said device, said device having saturation control windings connected with said armature circuit so as to be responsive to the current in said armature circuit and being poled for increasing said field excitation with increase of said current.

3. Speed-regulating drive control apparatus, comprising, an electric motor including a direct-current armature circuit and a speed-controlling field circuit, alternating current supply means, a controllable rectifier connected between said supply means and said field circuit for applying rectified excitation to said field circuit and having a control circuit for varying said excitation, a speed-responsive source of variable error voltage connected with said control circuit for regulating said rectifier in accordance with a desired speed, a transformer having a primary circuit connected to said supply means and having a secondary phase shift in circuit connected with said control circuit to provide the latter with alternating control voltage, a saturable reactance device having two saturation-responsive impedance windings and a saturation control winding, said impedance windings being connected in said primary circuit and in said phase shift circuit respectively to control amplitude and phase respectively of said alternating control voltage, and a resistance member series-connected in said armature circuit to provide a variable voltage dependent upon the current in said armature, said saturation control winding being connected across said resistance member and poled to cause increase of said excitation with increase of said current.

4. In apparatus according to claim 3, said saturable reactance device having a second saturation control winding opposingly related to said first-mentioned saturation control winding, and adjustable constant-voltage supply means connected with said second control winding.

5. Speed-regulating drive control apparatus, comprising, an electric motor including a direct-current armature circuit and a speed-controlling field circuit, alternating current supply means, a controllable rectifier connected between said supply means and said field circuit for applying rectified excitation to said field circuit and having a control circuit for varying said excitation, a first transformer having a primary circuit connected to said supply means and having a second phase shift circuit, a second transformer primarily connected to said phase circuit and having a secondary phase shift circuit connected with said control circuit to provide the latter with alternating control voltage, a saturable reactance device having two saturation-responsive impedance windings and two mutually opposing saturation control windings, said impedance windings being connected respectively in said primary circuit and in said secondary circuit of said first transformer to control the amplitude and phase of said alternating control voltage, a resistance member series-connected in said armature circuit to provide a variable voltage dependent upon the current in said armature, one of said saturation control windings being connected across said resistance member, and adjustable constant-voltage supply means connected with said other saturation control winding.

6. In combination, a direct-current motor having an armature circuit and a separately excited field circuit, said armature circuit having a series resistance member to provide across said member a voltage drop proportional to the lead current, alternating-current supply means, rectifier means connecting said field circuit with said supply means to provide said field circuit with rectified excitation and having a control circuit for varying said excitation, a speed-responsive source of variable error voltage connected with said control circuit for controlling said rectifier means in accordance with a desired motor speed, a transformer having a primary circuit connected to said supply means and having a secondary phase shift circuit connected with said control circuit to provide the latter with alternating control voltage, a saturable reactance device having two saturation-responsive impedance windings and a saturation control winding, said impedance windings being connected in said primary circuit and in said phase shift circuit respectively to control amplitude and phase respectively of said alternating control voltage, and said saturation control winding being connected across said resistance member to be controlled in dependence upon said current.

JOSEPH F. KOVALSKY.

REFERENCES CITED

The following references are of record in the file of this patent:

UNITED STATES PATENTS

| Number | Name | Date |
|---|---|---|
| 1,991,088 | Forbes | Feb. 12, 1935 |
| 2,020,942 | Gulliksen | Nov. 12, 1935 |
| 2,421,632 | Livingston | June 3, 1947 |
| 2,488,247 | Burgwin et al. | Feb. 21, 1950 |
| 2,519,339 | Avery | Aug. 22, 1950 |